US008259760B2

(12) United States Patent
Chiabrera

(10) Patent No.: US 8,259,760 B2
(45) Date of Patent: Sep. 4, 2012

(54) APPARATUS AND METHOD FOR TRANSMITTING AND RECOVERING MULTI-LANE ENCODED DATA STREAMS USING A REDUCED NUMBER OF LANES

(75) Inventor: Michele Chiabrera, Ottawa (CA)

(73) Assignee: STMicroelectronics, Inc., Carrollton, TX (US)

( * ) Notice: Subject to any disclaimer, the term of this patent is extended or adjusted under 35 U.S.C. 154(b) by 1700 days.

(21) Appl. No.: 11/395,001

(22) Filed: Mar. 31, 2006

(65) Prior Publication Data

US 2007/0263533 A1    Nov. 15, 2007

(51) Int. Cl.
*H04J 3/02* (2006.01)
(52) U.S. Cl. .................. 370/535; 375/316; 375/346
(58) Field of Classification Search .......... 370/535–541; 375/240–241; 725/105–153
See application file for complete search history.

(56) References Cited

U.S. PATENT DOCUMENTS

| | | | | |
|---|---|---|---|---|
| 7,228,509 B1 * | 6/2007 | Dada et al. | | 716/102 |
| 7,460,563 B1 * | 12/2008 | Boluna | | 370/535 |
| 2002/0159457 A1 * | 10/2002 | Zhang et al. | | 370/391 |
| 2003/0217215 A1 * | 11/2003 | Taborek et al. | | 710/305 |
| 2004/0028156 A1 * | 2/2004 | Sefidvash et al. | | 375/346 |
| 2006/0227815 A1 * | 10/2006 | Khan | | 370/535 |
| 2007/0103338 A1 * | 5/2007 | Teo | | 340/933 |
| 2007/0110105 A1 * | 5/2007 | Usuki et al. | | 370/487 |

FOREIGN PATENT DOCUMENTS

WO    WO 2005/043784 A1    5/2005

* cited by examiner

*Primary Examiner* — Hassan Kizou
*Assistant Examiner* — Charles C Jiang

(57) ABSTRACT

A method includes receiving first encoded data associated with one or more first lanes and decoding the first encoded data to produce decoded data. The method also includes encoding the decoded data to produce second encoded data associated with one or more second lanes and transmitting the second encoded data. In some embodiments, the method may further include multiplexing a plurality of code group sequences (the second encoded data) into the one or more second lanes, and the number of first lanes may be greater than the number of second lanes. In other embodiments, the method may also include demultiplexing a plurality of code group sequences from the one or more first lanes into a plurality of the second lanes, and the number of first lanes may be less than the number of second lanes.

29 Claims, 10 Drawing Sheets

APPARATUS AND METHOD FOR TRANSMITTING AND RECOVERING MULTI-LANE ENCODED DATA STREAMS USING A REDUCED NUMBER OF LANES

TECHNICAL FIELD

This disclosure is generally directed to communication networks and more specifically to an apparatus and method for transmitting and recovering multi-lane encoded data streams using a reduced number of lanes.

BACKGROUND

The communication of data over communication networks often involves encoding and decoding the data. Many different coding schemes have been developed for use in encoding and decoding data. One conventional coding scheme is 8B/10B coding, which is defined in the IEEE 802.3 standard and is used in networks like ten-gigabit Ethernet networks. The 8B/10B coding scheme is used for physical coding sublayer (PCS) encoding and decoding of data.

In the 8B/10B coding scheme, 32 ten-gigabit media independent interface (XGMII) data bits and 4 XGMII control bits are encoded into and decoded from four 10-bit code groups. The encoding and decoding are typically performed using four parallel lanes, each lane associated with one 10-bit code group. Each lane is also typically associated with a separate physical medium attachment, meaning four physical medium attachments are routinely used in the 8B/10B coding scheme. A physical medium attachment typically supports access to a physical transmission medium, such as printed circuit board (PCB) tracks or lanes. The physical medium attachment may be responsible, for example, for serializaing and deserializing data between the physical transmission medium and the physical coding sublayer.

SUMMARY

This disclosure provides an apparatus and method for transmitting and recovering multi-lane encoded data streams using a reduced number of lanes.

In a first embodiment, a method includes receiving first encoded data associated with one or more first lanes and decoding the first encoded data to produce decoded data. The method also includes encoding the decoded data to produce second encoded data associated with one or more second lanes and transmitting the second encoded data. A number of first lanes is different than a number of second lanes.

In particular embodiments, the method further includes multiplexing a plurality of code group sequences (the second encoded data) into the one or more second lanes, and the number of first lanes is greater than the number of second lanes. In other particular embodiments, the method includes demultiplexing a plurality of code group sequences from the one or more first lanes into a plurality of the second lanes, and the number of first lanes is less than the number of second lanes.

In a second embodiment, an apparatus includes one or more first physical medium attachments capable of receiving first encoded data and a plurality of decoders capable of decoding the first encoded data to produce decoded data. The apparatus also includes a plurality of encoders capable of encoding the decoded data to produce second encoded data and one or more second physical medium attachments capable of transmitting the second encoded data. A number of first physical medium attachments is different than a number of second physical medium attachments.

In a third embodiment, a computer program is embodied on a computer readable medium and is capable of being executed by a processor. The computer program includes computer readable program code for receiving first encoded data associated with one or more first lanes and decoding the first encoded data to produce decoded data. The computer program also includes computer readable program code for encoding the decoded data to produce second encoded data associated with one or more second lanes and transmitting the second encoded data. A number of first lanes is different than a number of second lanes.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
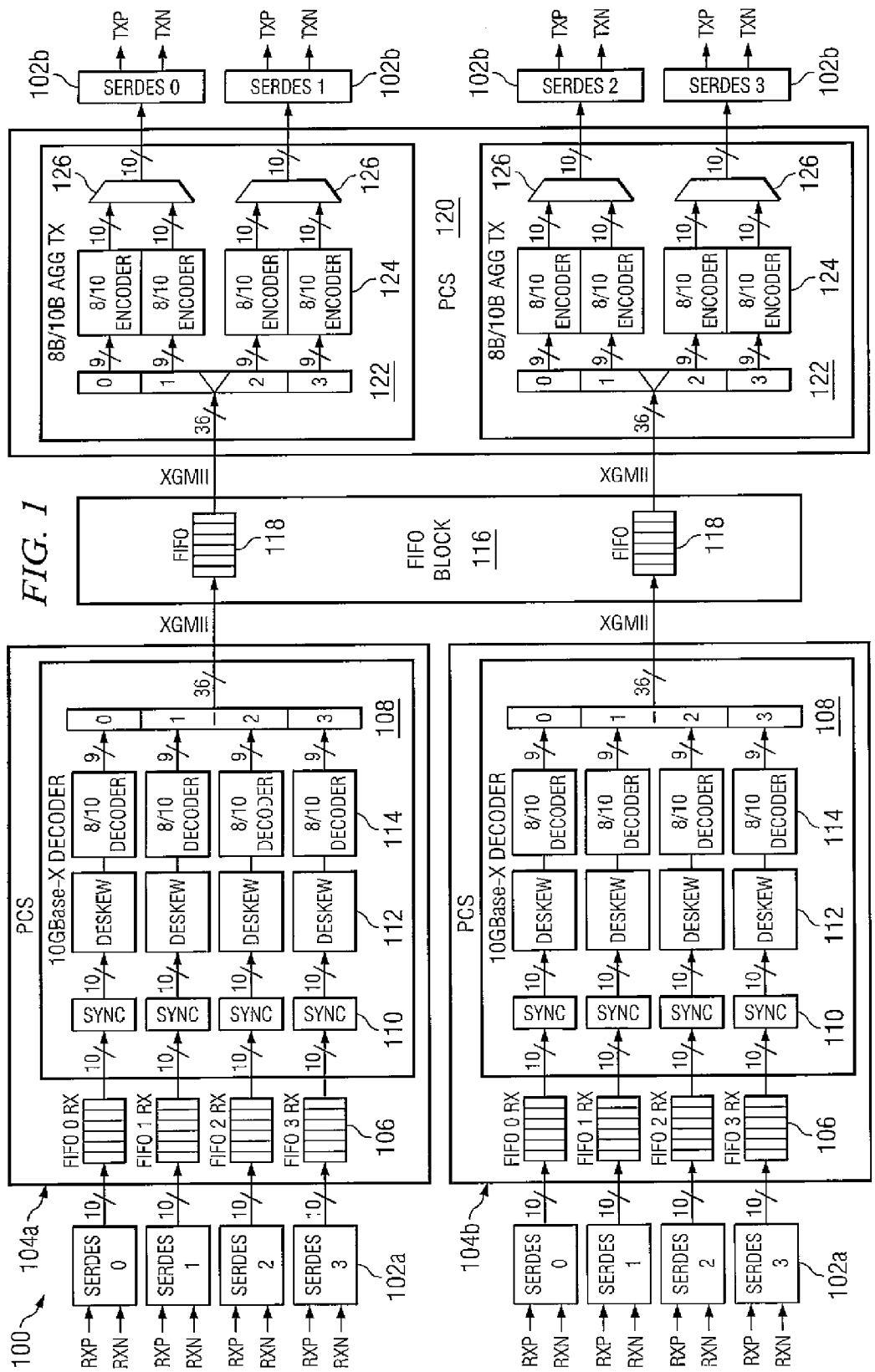
FIGS. 1 and 2 illustrate an example device for transmitting and recovering multi-lane encoded data streams using a reduced number of lanes according to one embodiment of this disclosure.
Figure 2:
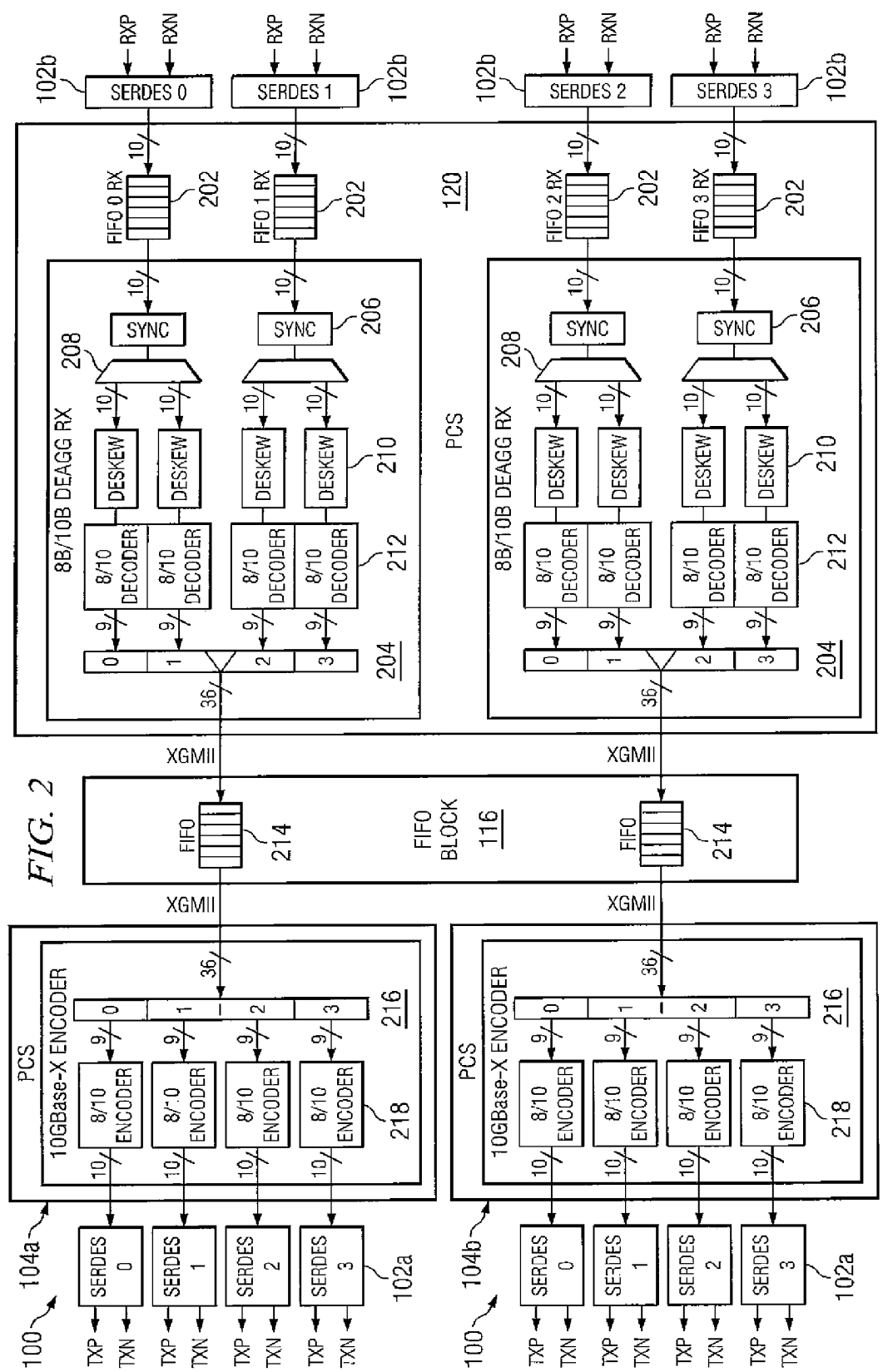

FIGS. 1 and 2 illustrate an example device 100 for transmitting and recovering multi-lane encoded data streams using a reduced number of lanes according to one embodiment of this disclosure. In particular, FIG. 1 illustrates the device 100 configured to transmit an 8B/10B encoded data stream using two lanes associated with two physical medium attachments, and FIG. 2 illustrates the device 100 configured to receive an 8B/10B encoded data stream using two lanes associated with two physical medium attachments. The embodiment of the device 100 shown in FIGS. 1 and 2 is for illustration only. Other embodiments may be used without departing from the scope of this disclosure.

In one aspect of operation, the device 100 transmits and recovers multi-lane encoded data streams using a reduced number of lanes. For example, the device 100 could receive 8B/10B encoded data over four lanes and transmit the data over one or two lanes. Similarly, the device 100 could recover 8B/10B encoded data received over one or two lanes and transmit the data over four lanes. In this way, the device 100 may multiplex lanes that are underutilized or use fewer lanes that run at a higher data rate. Also, the data transmitted or recovered by the device 100 may include separators between data elements, such as comma strings between code groups. The device 100 may implement one or more techniques for avoiding the generation of comma strings across code group boundaries or for detecting comma strings generated across code group boundaries. In this way, the device 100 may use a reduced number of lanes while maintaining the run-length limited properties of the lanes, maintaining the direct current (DC) balance of the lanes, and avoiding inadvertent comma strings.

As shown in FIG. 1, the device 100 includes multiple serializers/deserializers (SERDES) 102a-102b. The serializers/deserializers 102a-102b are capable of converting parallel data into serial format and converting serial data into parallel format. In this configuration, each of the serializers/deserializers 102a is used to deserialize a serial differential signal that is received over two signal lines denoted RXP and RXN. Similarly, each of the serializers/deserializers 102b is used to serialize parallel data into a serial differential signal that is transmitted over two signal lines denoted TXP and TXN. Each of the serializers/deserializers 102a-102b includes any hardware, software, firmware, or combination thereof for serializaing and/or deserializing data.

Each of the serializers/deserializers 102a-102b may represent a physical medium attachment. A physical medium attachment provides access to a physical connection, such as printed circuit board (PCB) tracks or lanes. In these embodiments, each of the serializers/deserializers 102a-102b may include a connector for coupling to a transmission medium.

Two physical coding sublayer (PCS) modules 104a-104b are coupled to the serializers/deserializers 102a. The PCS modules 104a-104b decode encoded data that is received via the serializers/deserializers 102a and provide the decoded data for further processing. In this example, each of the PCS modules 104a-104b includes a first-in, first-out (FIFO) queue 106 for each serializer/deserializer 102a coupled to that PCS module. Each queue 106 stores the deserialized data output by one of the serializers/deserializers 102a and facilitates retrieval of the deserialized data by other components of the PCS modules 104a-104b. Each queue 106 represents any suitable structure for storing and facilitating retrieval of information.

Each of the PCS modules 104a-104b also includes a ten-gigabit base-X (10GBase-X) decoder 108. The 10GBase-X decoder 108 is capable of decoding the deserialized data retrieved from the queues 106. For example, the deserialized data could have been encoded using 8B/10B encoding, and the 10GBase-X decoder 108 could implement the necessary functions to decode and recover the data. The 10GBase-X decoder 108 includes any hardware, software, firmware, or combination thereof for decoding data.

In this example, the 10GBase-X decoder 108 includes multiple lanes (denoted "0" through "3") each associated with a synchronization module 110, a deskew module 112, and an 8B/10B decoder 114. The synchronization module 110 performs synchronization operations needed to synchronize with the serialized data for that lane, such as by performing comma detection according to Clause 48.2.6.2.2 of the IEEE 802.3 standard. The deskew module 112 performs deskewing operations, such as lane alignment, according to Clause 48.2.6.2.3 of the IEEE 802.3 standard. The 8B/10B decoder 114 performs decoding operations to decode data previously encoded using the 8B/10B encoding scheme. The outputs of the four lanes combine to form a single output of that PCS module. Each of the components in the 10GBase-X decoder 108 may include any hardware, software, firmware, or combination thereof for performing the appropriate functions. In this document, the term "path" refers to any data processing or transmission route, including a route through part or all of the device 100 or a route through a physical medium attachment (and its associated transmission medium). Also, the IEEE 802.3 and 802.3ae standards are hereby incorporated by reference.

The outputs from the two PCS modules 104a-104b are stored in a FIFO block 116, which includes a FIFO queue 118 for each of the PCS modules 104a-104b. Each queue 118 represents any suitable structure for storing and facilitating retrieval of data output by one of the PCS modules 104a-104b.

A PCS module 120 is coupled to the FIFO block 116. The PCS module 120 is capable of encoding data stored in the FIFO block 116 and transmitting the encoded data over a reduced number of physical medium attachments. In this example, the PCS module 120 includes two 8B/10B aggregate transmitters 122. Each transmitter 122 is capable of generating and communicating an 8B/10B encoded data stream across a reduced number of physical medium attachments (such as two physical medium attachments represented by two serializers/deserializers 102b). Each transmitter 122 includes any hardware, software, firmware, or combination thereof for transmitting encoded data over a reduced number of physical medium attachments.

In this example, each transmitter 122 includes multiple 8B/10B encoders 124 and multiple multiplexers 126. The 8B/10B encoders 124 are capable of receiving data from the FIFO block 116 and encoding the data using 8B/10B coding. For example, each 8B/10B encoder 124 may receive 9-bit data values and output a sequence of 10-bit code groups. Each multiplexer 126 receives encoded data from some of the 8B/10B encoders 124 and multiplexes the encoded data onto a single connection to one of the serializers/deserializers 102b. In this way, the multiplexers 126 in a transmitter 122 allow encoded data from four lanes to be transmitted over two lanes (represented by two serializers/deserializers 102b coupled to that transmitter 122). Each of the components in the transmitters 122 may include any hardware, software, firmware, or combination thereof for performing the appropriate functions.

In this example embodiment, the 10GBase-X decoder 108 receives 10-bit code groups, and each decoder 114 decodes the code groups to produce 9-bit data values (each with an 8-bit payload and a 1-bit control or header). The 9-bit data values from the four decoders 114 in a single PCS module 104a or 104b combine to form a 36-bit data value, which is stored in the appropriate queue 118. A 36-bit data value is retrieved from a queue 118 by the corresponding transmitter 122. The 36-bit data value is encoded by the 8B/10B encoders 124 into four 10-bit code groups. The code groups are then multiplexed over two physical medium attachments, although a different number of physical medium attachments (such as one physical medium attachment) could be used.

As shown in FIG. 2, the device 100 is also capable of receiving an encoded data stream using a reduced number of lanes and recovering the data from the data stream. In this example, the PCS module 120 further includes multiple FIFO queues 202 and two 8B/10B aggregate receivers 204. In this embodiment, each of the serializers/deserializers 102b may serialize incoming data that forms an encoded data stream, and each queue 202 stores the serialized data output by one of the serializers/deserializers 102b. Each queue 202 represents any suitable structure for storing and facilitating retrieval of information.

Each receiver 204 is capable of receiving an 8B/10B encoded data stream across a reduced number of physical medium attachments (in this case, two physical medium attachments represented by two serializers/deserializers 102b) and recovering the encoded data. Each receiver 204 includes any hardware, software, firmware, or combination thereof for receiving encoded data over a reduced number of physical medium attachments.

In this example, each receiver 204 supports multiple lanes (denoted "0" through "3") and includes synchronization modules 206, demultiplexers 208, deskew modules 210, and 8B/10B decoders 212. The synchronization modules 206 perform synchronization operations needed to synchronize with the serialized data from the queues 202, such as by performing comma detection according to Clause 48.2.6.2.2 of the IEEE 802.3 standard. Each demultiplexer 208 separates the data received via a single physical medium attachment into two separate lanes. The deskew modules 210 perform deskewing operations, such as lane alignment, according to Clause 48.2.6.2.3 of the IEEE 802.3 standard (as modified below). The 8B/10B decoders 212 are capable of decoding encoded data provided by the deskew modules 210. For example, each 8B/10B decoder 212 may receive a sequence of 10-bit code groups and output 9-bit data values. The 9-bit data values from the four decoders 212 collectively form 36-bit values. Each of the components in the receiver 204 may include any hardware, software, firmware, or combination thereof for performing the appropriate functions.

The 36-bit outputs of the receivers 204 are stored in FIFO queues 214 in the FIFO block 116. The queues 214 could represent the same structures as the queues 118 of FIG. 1, or the queues 214 could represent structures that are separate from the queues 118.

In this example, each of the PCS modules 104a-104b also includes a 10GBase-X encoder 216. Each 10GBase-X encoder 216 is capable of encoding the decoded data produced by one of the receivers 204. For example, the 10GBase-X encoders 216 could encode the decoded data using 8B/10B encoding and then provide the encoded data to the serializers/deserializers 102a, which serialize the encoded data for transmission. Each 10GBase-X encoder 216 includes any hardware, software, firmware, or combination thereof for encoding data. As shown in FIG. 2, each 10GBase-X encoder 216 may include multiple 8B/10B encoders 218, each of which encodes data in one of four lanes of the 10GBase-X encoder 216.

In this example embodiment, each receiver 204 receives 10-bit code groups. A set of four 10-bit code groups (representing encoded data from four lanes in a transmitter) is received via two physical medium attachments, although a different number of physical medium attachments (such as one physical medium attachment) could be used. Each set of four 10-bit code groups is demultiplexed and decoded to generate four 9-bit values for a total of 36 bits. The 36-bit values are stored in the FIFO block 116 and then retrieved by the 10GBase-X encoders 216. Each 36-bit value enters into four 9-bit lanes in one of the 10GBase-X encoders 216, and the encoders 218 encode the 9-bit values into 10-bit code groups suitable for further transmission.

As noted above, FIGS. 1 and 2 illustrate the transmission and reception of a multi-lane encoded data stream using a reduced number of lanes/physical medium attachments. In this example embodiment, an encoded data stream is sent or received across two physical medium attachments. In other embodiments, an encoded data stream may be sent or received across one physical medium attachment. In these examples, serial transmit and receive clocks used by the serializers/deserializers 102b may have a frequency that is increased by a factor of two when two physical medium attachments are used and by a factor of four when one physical medium attachment is used. Also, these embodiments may maintain a high transmission density while being run-length limited, being direct current (DC) balanced, and maintaining the original 8B/10B coding. In addition, these embodiments may allow the same data rate to be achieve over a fewer number of lanes than existing solutions (one or two lanes instead of four) or to achieve twice the data rate when utilizing preexisting four lane backplanes.

Figure 3A:
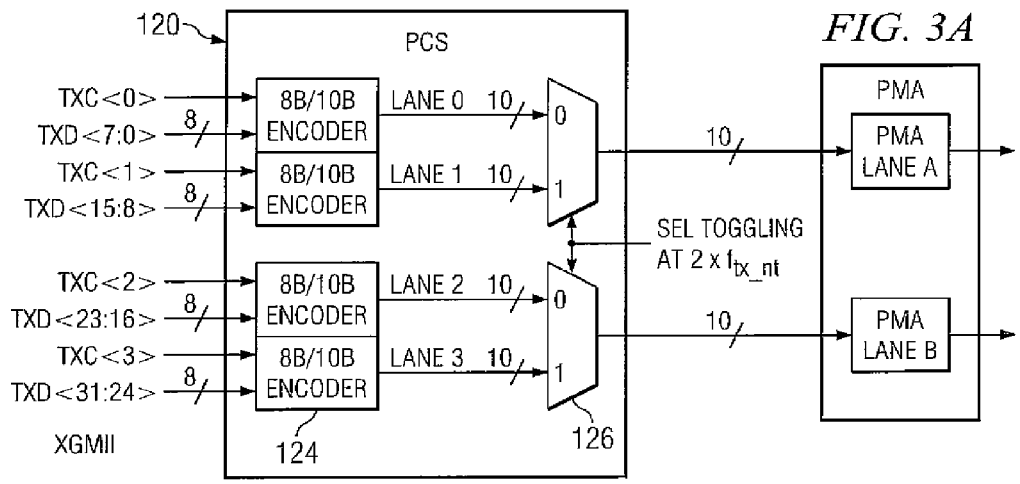
FIGS. 3A and 3B illustrate additional details of an example device for transmitting multi-lane encoded data streams using a reduced number of lanes according to one embodiment of this disclosure.
Figure 3B:
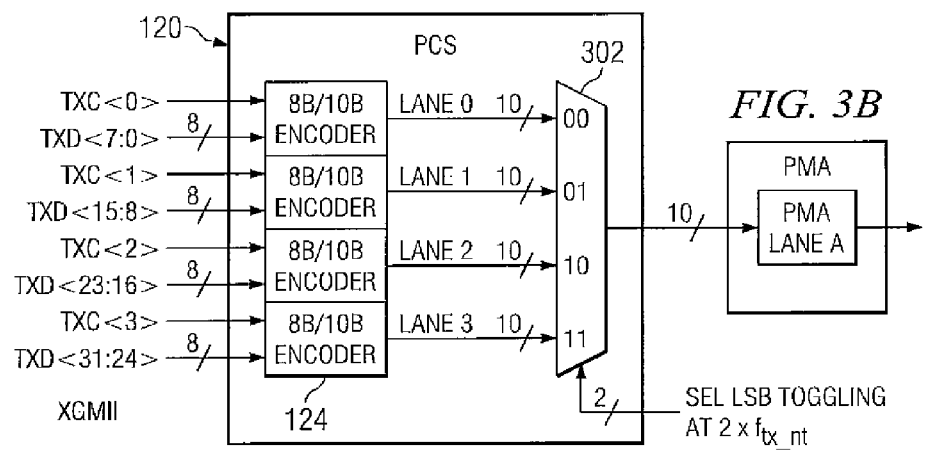
Figure 6:
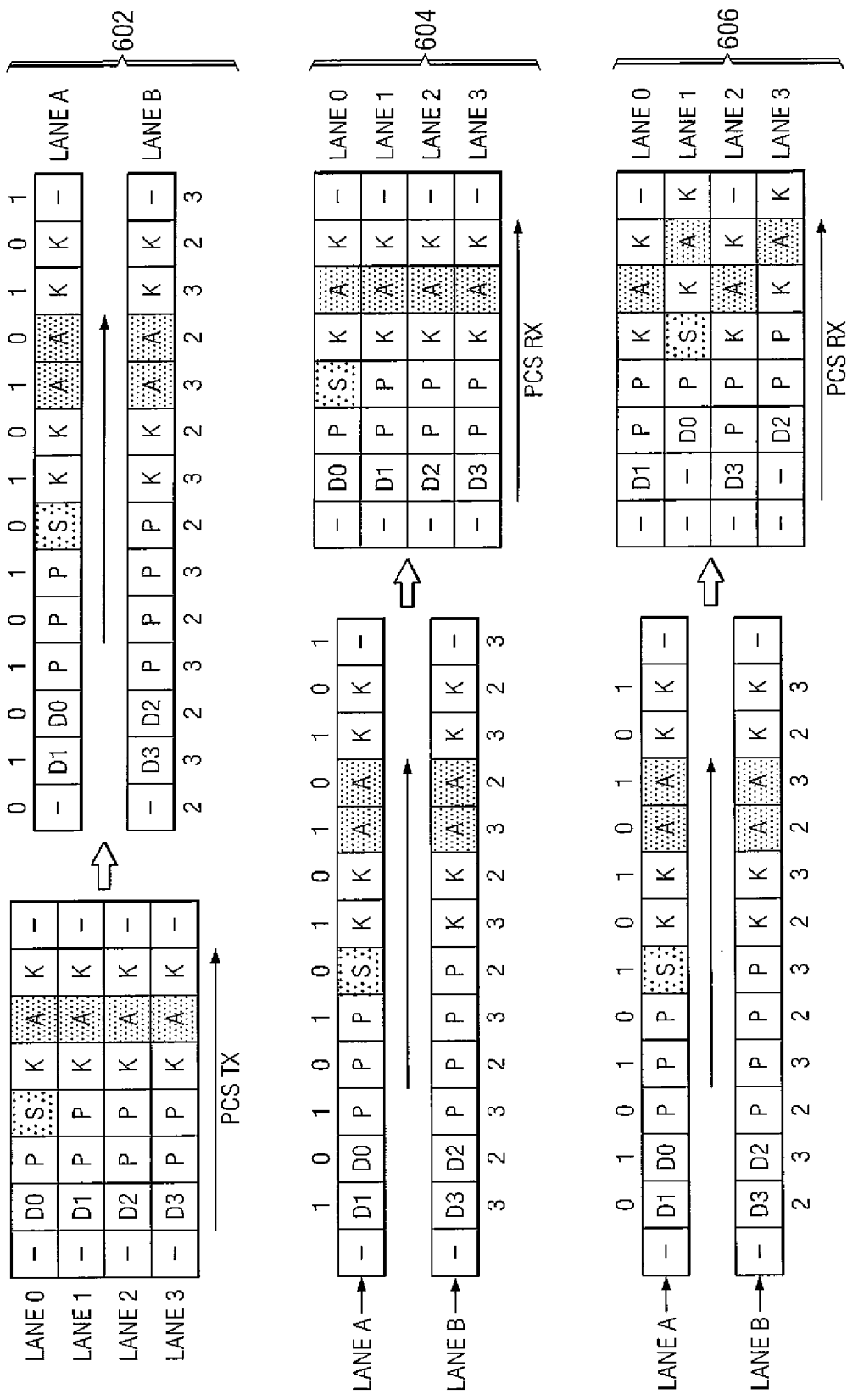
FIGS. 6 and 7 illustrate example transmissions and receptions of multi-lane encoded data streams using a reduced number of lanes according to one embodiment of this disclosure.
Figure 7:
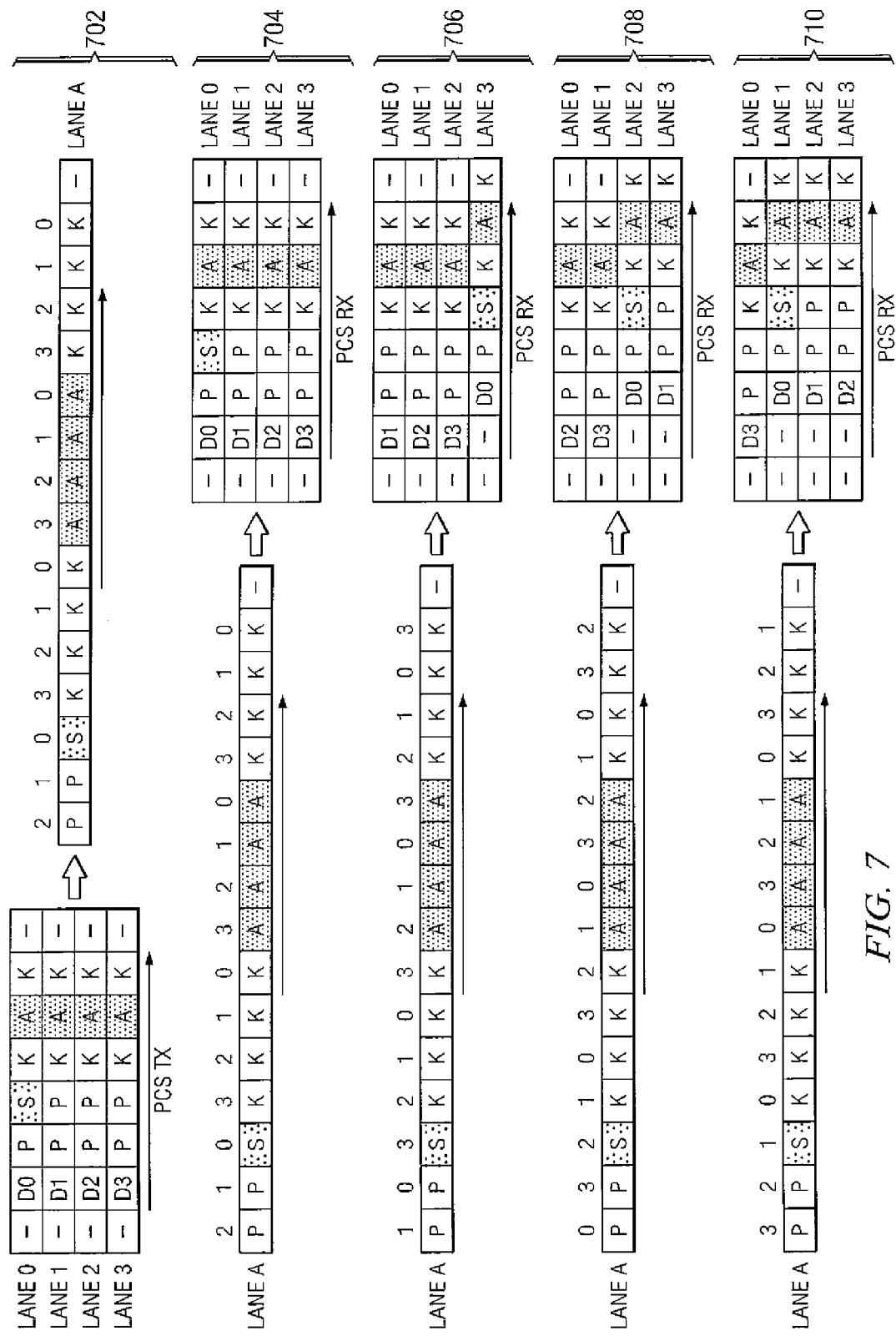

Additional details of how encoded data from four lanes is transmitted across one or two physical medium attachments are provided in FIGS. 3A and 3B. Additional details of how encoded data from four lanes is received over one or two physical medium attachments are provided in FIGS. 5A and 5B. Example operations of the device 100 are shown in FIGS. 6 and 7.

Although FIGS. 1 and 2 illustrate one example of a device 100 for transmitting and recovering multi-lane encoded data streams using a reduced number of lanes, various changes may be made to FIGS. 1 and 2. For example, FIGS. 1 and 2 illustrate the transmission and reception of an encoded data stream across two physical medium attachments (two of the serializers/deserializers 102b). Any other reduced number of physical medium attachments could be used in the device 100 to transmit or receive an encoded data stream, such as one physical medium attachment. Also, while shown as having two PCS modules 104a-104b, two transmitters 122, and two receivers 204, the device 100 could include only one or more than two of these components. In addition, FIGS. 1 and 2 illustrate one example device 100 in which multi-lane encoded data streams may be sent or received over a reduced number of physical medium attachments. The mechanisms for sending and receiving encoded data streams over a reduced number of physical medium attachments could be used in any other suitable device or system.

FIGS. 3A and 3B illustrate additional details of an example device 100 for transmitting multi-lane encoded data streams using a reduced number of lanes according to one embodiment of this disclosure. In particular, FIG. 3A illustrates how the device 100 transmits encoded data from four lanes over two physical medium attachments (PMAs), and FIG. 3B illustrates how the device 100 transmits encoded data from four lanes over one physical medium attachment.

As shown in FIG. 3A, the encoders 124 in the physical coding sublayer 120 encode four XGMII octets and four control signals into four 10-bit code groups. Each 10-bit code group is sent to one of two parallel lanes (lane A or lane B) via the multiplexers 126. In this example, the multiplexers 126 reduce the number of needed lanes from four to two. The XGMII octet rate and the 10-bit code group rate within the physical coding sublayer 120 are the same and are denoted $f_{TX\_CLK}$. In the two parallel lanes A and B, the 10-bit code group rate is twice the value of $f_{TX\_CLK}$ (the multiplexers 126 receive a select signal that toggles at a rate of $2\times f_{TX\_CLK}$), and the serial PMA bit rate is twenty times the value of $f_{TX\_CLK}$.

In particular embodiments, the device 100 may operate as follows. Denote the code groups sent over lanes A and B as $L_A$ and $L_B$, respectively. Also, denote the code groups sent over lanes 0 through 3 as $L_0$ through $L_3$, respectively. The code groups $L_A$ and $L_B$ may come from lanes 0 and 2 on even transfers and from lanes 1 and 3 on odd transfers. The relationship between the code groups in lanes A and B and the code groups in lanes 0 through 3 can be expressed as:

$$(L_A(2n), L_B(2n)) = (L_0(n), L_2(n))$$

$$(L_A(2n+1), L_B(2n+1)) = (L_1(n), L_3(n))$$

where n represents the number of the transfer. The above relationships imply that the four 10-bit code groups that originate from the same XGMII transfer n are transmitted starting from lanes 0 and 2 first. Bit ordering within each 10-bit code group transfer is therefore maintained. Reference numeral 602 in FIG. 6 illustrates one example of the communication of encoded data from four lanes over two lanes.

According to Clause 36 of the IEEE 802.3 standard, the 8B/10B encoding scheme ensures a high transition density (3 to 8 transitions per symbol), is run-length limited, and is DC balanced. In the device 100, the sequence of code groups sent to each underlying physical medium attachment may be created by interleaving code groups from two different 8B/10B encoders 124. As a result, the original properties of the 8B/10B encoding scheme may be maintained by the device 100.

The DC balance of the code groups may be obtained by defining two possible code groups for any given XGMII octet. In some embodiments, a running disparity variable is defined and used to select which of the two code groups is utilized. In conventional encoders, this variable is updated after each encoding according to rules defined in Clause 36.2.4.4 of the IEEE 802.3 standard. The rules ensure, among other things, that no seven-bit comma strings can be generated across code group boundaries. In this way, comma strings can only appear when sending a special code group (code group "K28.5"). Comma strings are utilized by the synchronization modules 206 in a receiver to achieve 10-bit code group delineation. The generation of comma strings across code group boundaries can lead a receiver to align itself to an incorrect 10-bit code group delineation and is therefore avoided by construction in the standard 8B/10B encoding mechanism.

Figure 4:
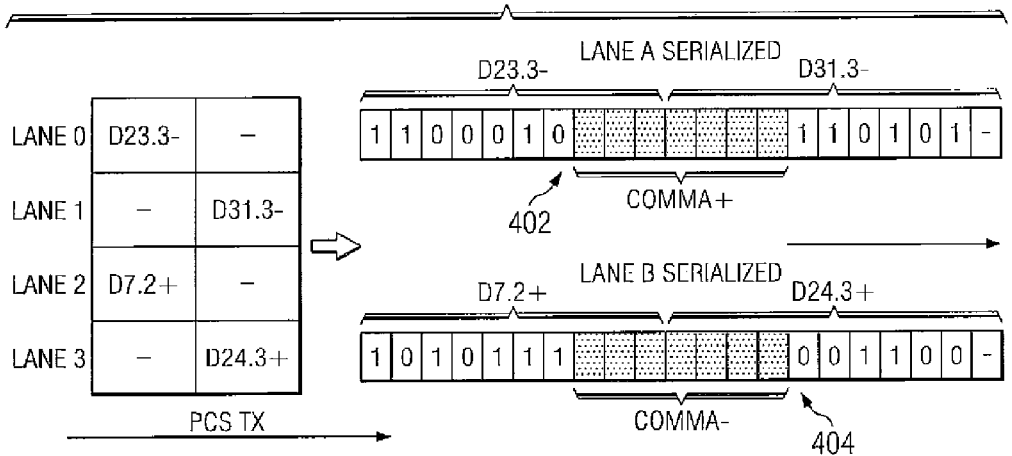
FIG. 4 illustrates an example comma detection associated with transmission of a multi-lane encoded data stream using a reduced number of lanes according to one embodiment of this disclosure.

According to this disclosure, different techniques are provided for avoiding the generation of comma strings across code group boundaries or for detecting comma strings generated across code group boundaries. As shown in FIG. 4, reference numeral 402 denotes a valid comma string, while reference numeral 404 denotes an invalid comma string that could be detected as a valid comma string by a receiving device. Various mechanisms could be used to handle this situation and avoid false comma detection. In a first approach, running disparity values are calculated jointly by a pair of 8B/10B encoders 124 (such as a pair for lanes 0 and 1 and a pair for lanes 2 and 3). As a particular example, after generating code groups using their own current running disparity values, each encoder 124 updates its own running disparity value using the rules defined in Clause 36.2.4.4 of the IEEE 802.3 standard. However, each encoder 124 does not utilize its own updated running disparity value for the next encoding operation.

Using the first approach, let the current running disparity value utilized to encode the $n^{th}$ code group by the encoder 124 in lane m be denoted $RD_m(n)$, and let the updated running disparity value calculated after the $n^{th}$ encoding by the encoder 124 in lane m be denoted $URD_m(n)$. In this approach, the encoder 124 in lane 0 would use, as its current $RD_0(n)$ value, the running disparity value from the encoder 124 in lane 1 from the previous encoding, which is denoted $URD_1(n-1)$. The encoder 124 in lane 1 would use, as its current $RD_1(n)$ value, the running disparity value from the encoder 124 in lane 0 from the current encoding, which is denoted $URD_0(n)$. In this running disparity update process, each encoder pair may effectively be working as a 16B/20B encoder. This running disparity update algorithm can be formalized for all four lanes as follows:

LANE 0: $RD_0(n) = URD_1(n-1)$

LANE 1: $RD_1(n) = URD_0(n)$

LANE 2: $RD_2(n) = URD_3(n-1)$

LANE 3: $RD_3(n) = URD_2(n)$.

As specified in the IEEE standard, the initial running disparity of the transmitter may assume a negative value, which implies:

$RD_0(0)$=negative $RD_1(0) = URD_0(0)$ $RD_2(0)$=negative $RD_3(0) = URD_2(0)$

In a second approach, running disparity values are calculated independently by each encoder 124. In this approach, a modification is made to the receiving device's physical coding sublayer 120 to compensate for the presence of a comma string across a code group boundary. This approach is described in more detail below.

As shown in FIG. 3B, the two multiplexers 126 from FIG. 3A have been replaced by a single multiplexer 302. In this embodiment, the encoders 124 in the physical coding sublayer 120 encode four XGMII octets and four control signals into four 10-bit code groups. The 10-bit code groups from the encoders 124 are then multiplexed onto a single lane via the multiplexer 302. The multiplexer 302 therefore reduces the number of needed lanes from four to one. In this example, the 10-bit code group rate in the single lane (lane A) is four times the rate of $f_{TX\_CLK}$, and the multiplexer 302 receives a select signal that toggles at a rate of $4\times f_{TX\_CLK}$. As a result, the serial PMA bit rate is forty times the value of $f_{TX\_CLK}$.

In particular embodiments, the device 100 may operate as follows. Denote the code groups sent over lane A as $L_A$, and denote the code groups sent over lanes 0 through 3 as $L_0$ through $L_3$, respectively. The code groups $L_A$ sent to the underlying physical medium attachment come from lanes 0 through 3 in a round-robin fashion. The relationship between the code groups in lane A and the code groups in lanes 0 through 3 can be expressed as:

$L_A(4n) = L_0(n)$ $L_A(4n+1) = L_0(n)$ $L_A(4n+2) = L_2(n)$ $L_A(4n+3) = L_3(n)$.

The above relationships imply that the four 10-bit code groups that originate from the same XGMII transfer n are transmitted starting from lane 0 and ending from lane 3. Bit ordering within each 10-bit code group transfer is therefore maintained. Reference numeral 702 in FIG. 7 illustrates one example of the communication of encoded data from four lanes over one lane.

The device 100 operating as shown in FIG. 3B may avoid generating seven-bit comma strings across code group boundaries. Modifying the first approach described above, all four encoders 124 in a transmitter 122 could collectively calculate their running disparity values. For example, in the running disparity value update process, the encoders 124 may effectively work as a 32B/40B encoder. In this case, the running disparity updating rules can be formalized as follows:

LANE 0: $RD_0(n) = URD_3(n-1)$

LANE 1: $RD_1(n) = URD_0(n)$

LANE 2: $RD_2(n) = URD_1(n)$

LANE 3: $RD_3(n) = URD_2(n)$

As specified in the IEEE standard, the initial running disparity of the transmitter may assume a negative value, which implies:

$RD_0(0)$ = negative $RD_1(0) = URD_0(0)$ $RD_2(0) = URD_1(0)$ $RD_3(0) = URD_2(0)$.

Using the second approach described above, no actions need to be taken by the device 100 that is transmitting the encoded data stream.

Although FIGS. 3A and 3B illustrate additional details of one example device 100 for transmitting multi-lane encoded data streams using a reduced number of lanes, various changes may be made to FIGS. 3A and 3B. For example, while shown as transmitting encoded data from four lanes using one lane or two lanes, the mechanisms shown in FIGS. 3A and 3B could be modified to transmit any multi-lane encoded data stream using any suitable reduced number of lanes.

Figure 5A:
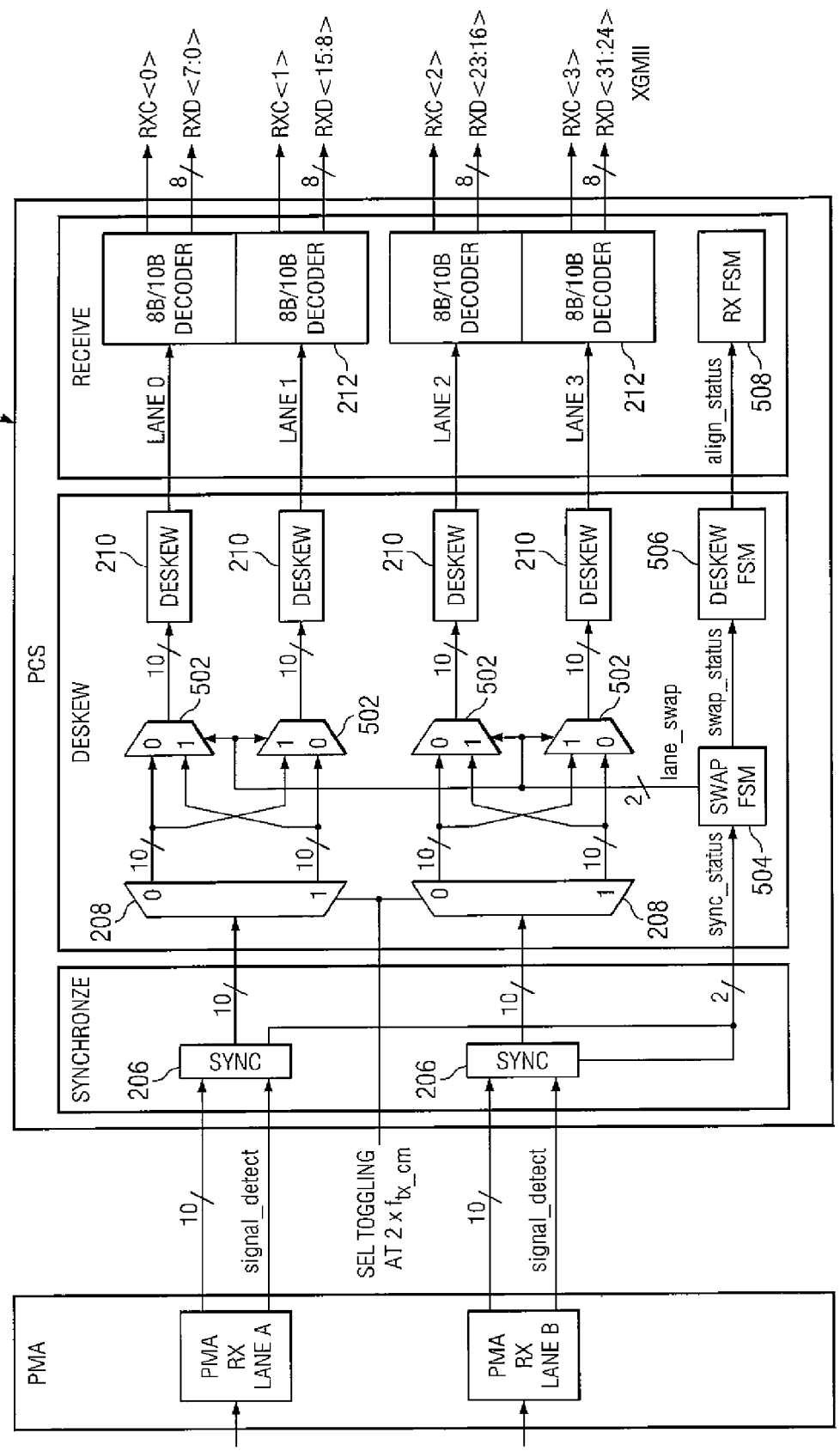
FIGS. 5A and 5B illustrate additional details of an example device for receiving multi-lane encoded data streams using a reduced number of lanes according to one embodiment of this disclosure.
Figure 5B:
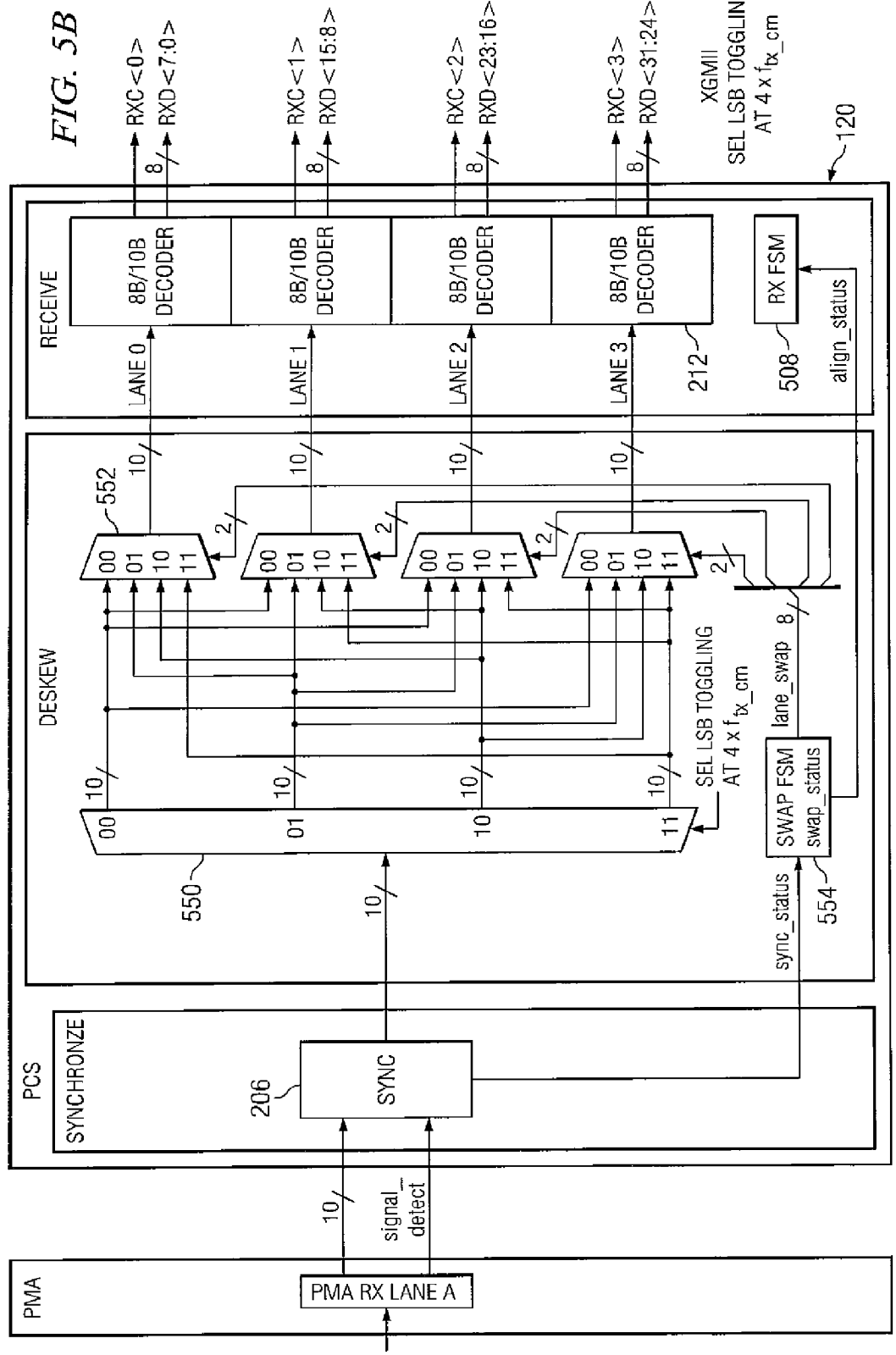

FIGS. 5A and 5B illustrate additional details of an example device 100 for receiving multi-lane encoded data streams using a reduced number of lanes according to one embodiment of this disclosure. In particular, FIG. 5A illustrates how the device 100 receives encoded data from four lanes over two physical medium attachments (also known as a 2:4 architecture), and FIG. 5B illustrates how the device 100 receives encoded data from four lanes over one physical medium attachment (also known as a 1:4 architecture).

As shown in FIG. 5A, the physical coding sublayer 120 reconstructs four 10-bit code groups from two parallel lanes using a demultiplexing scheme. The demultiplexing scheme ungroups 10-bit code groups received at a rate of $2 \times f_{RX\_CLK}$ into 10-bit code groups transferred to the deskew modules 210 at a rate of $f_{RX\_CLK}$. The two demultiplexers 208 are used to achieve a two-lane to four-lane expansion. Both demultiplexers 208 receive the same select signal, which toggles at a rate of $2 \times f_{RX\_CLK}$.

In particular embodiments, the device 100 may operate as follows. Denote the code groups received over lanes A and B as $L_A$ and $L_B$, respectively. Also, denote the code groups sent over lanes 0 through 3 as $L_0$ through $L_3$, respectively. Two code groups $L_A$ and $L_B$ received from lanes A and B may be demultiplexed into lanes 0 and 2 on even transfers and into lanes 1 and 3 on odd transfers. The relationship between the code groups in lanes A and B and the code groups in lanes 0 through 3 can be expressed as:

$$(L_0(n), L_2(n)) = (L_A(2n), L_B(2n))$$

$$(L_1(n), L_3(n)) = (L_A(2n+1), L_B(2n+1)).$$

The above relationships imply that, in the absence of any lane-to-lane skew, the four 10-bit code groups that originate from the same XGMII transfer n are received starting from lanes 0 and 2 first. Bit ordering within each 10-bit code group transfer is therefore maintained. Reference numeral 604 in FIG. 6 illustrates one example of the reception of encoded data from four lanes over two lanes.

Lane-to-lane skew is generally present in multi-lane systems. In the device 100 operating as shown in FIG. 5A, lane-to-lane skew could be divided into two components. One component is the lane-to-lane skew present between lanes A and B, which is the classical lane-to-lane skew due to transmit serialization, printed circuit board track skew, receive deserialization, and clock synchronization. The second component may be introduced by the proposed transmission lane reduction mechanism itself. In particular embodiments, the demultiplexers 208 shown in FIG. 5A are not aware if received 10-bit code groups are coming from the transmitting physical coding sublayer's even or odd lanes. For example, code groups originally sent from the transmitter's lane 0 could be transferred by the demultiplexers 208 into the receiver's lane 1. This means that lanes 0 and 1 may appear skewed and that the start of a code group may appear in an incorrect lane due to the lane swap. Reference numeral 606 in FIG. 6 illustrates one example of the skewed reception of encoded data from four lanes over two lanes. Among other things, this skew causes the start of a code group (denoted "S" in FIG. 6) to be in an incorrect lane (any lane other than lane 0).

The classical lane skewing effect may be corrected using the deskew modules 210. The lane swaps may be corrected using multiplexers 502, which compensate for the lane swaps before the code groups are transferred to the deskew modules 210. As an example, the multiplexers 502 help to ensure that the start of a code group appears as expected in lane 0.

A swap finite state machine (FSM) 504 monitors incoming 10-bit code groups, detects a swapped lane situation, establishes the correct lane ordering, and compensates for the skew introduced by correcting the swapped lanes. This is done in order to make the lane reduction and lane reconstruction process transparent to the deskew modules 210. Additional details regarding the finite state machine 504 are provided below.

Two other finite state machines 506-508 are also provided in the physical coding sublayer 120. A deskew finite state machine 506 uses the output of the state machine 504 to control the deskew modules 210. A receiver finite state machine 508 uses an output of the state machine 506 to control the decoding of the received data.

To avoiding false comma detections, the first approach involves using pairs of decoders 212 to jointly determine their running disparity values. For example, each decoder pair may effectively be working as a 16B/20B decoder. Each decoder 212 updates its own current running disparity value but does not use the updated value itself, in the same way that the encoders 124 update and use their running disparity values.

Using the same notation as above, the current running disparity values may be updated as follows:

LANE 0: $RD_0(n)=URD_1(n-1)$

LANE 1: $RD_1(n)=URD_0(n)$

LANE 2: $RD_2(n)=URD_3(n-1)$

LANE 3: $RD_3(n)=URD_2(n)$.

Also, the initial running disparity of the receiver may assume either a positive or negative value, which implies:

$RD_0(0)$=negative or positive $RD_1(0)=URD_0(0)$ $RD_2(0)$=negative or positive $RD_3(0)=URD_2(0)$.

The second approach to avoiding false comma detections involves modifying a receiving device's physical coding sublayer 120. In this approach, the synchronization modules 206 use a modified comma detection algorithm to avoid being misled by a false comma string.

In some embodiments, the synchronization modules 206 attempt to locate two consecutive commas instead of only one. In particular embodiments, a ||K|| ordered set appears at each synchronization module 206 as a sequence of two consecutive /K/ code groups as can be seen at reference numeral 606 in FIG. 6. When a synchronization module 206 detects a first comma, it locks temporarily to the specific 10-bit code group delineation implied by the first comma detection. In the absence of bit errors, the synchronization module 206 expects a second comma in the next 10-bit code group. If two consecutive commas are present in the expected bit positions, a comma has been validly detected. This event may be used in place of the PUDI([/COMMA/]) message defined in Clause 48 FIG. 48-7 of the IEEE 802.3 standard.

Moreover, in the absence of bit errors, the probability of having two false comma detections across two successive code group boundaries of interleaved code groups coming from two different lanes can become arbitrarily low by increasing the number of double comma checks performed by the synchronization modules 206 before achieving synchronization. The synchronization finite state machine in Clause 48 FIG. 48-7 of the IEEE 802.3 standard performs four checks, which gives a probability of error that is less than $10^{-17}$.

As shown in FIG. 5B, the two demultiplexers 208 from FIG. 5A have been replaced by a single demultiplexer 550. Also, the two-input multiplexers 502 from FIG. 5A have been replaced by four-input multiplexers 552. In this embodiment, the physical coding sublayer 120 implements a demultiplexing scheme that ungroups 10-bit code groups received at a rate of $4 \times f_{RX\_CLK}$ into 10-bit code groups transferred to the deskew modules 210 at a rate of $f_{RX\_CLK}$. The demultiplexer 550 is used to achieve a one-lane to four-lane expansion using a select signal that toggles at a rate of $4 \times f_{RX\_CLK}$.

In particular embodiments, the device 100 may operate as follows. Denote the code groups received over lane A as $L_A$, and denote the code groups sent over lanes 0 through 3 as $L_0$ through $L_3$, respectively. The code groups $L_A$ received over the underlying physical medium attachment are sent to lanes 0 through 3 in a round-robin fashion. The relationship between the code groups in lane A and the code groups in lanes 0 through 3 can be expressed as:

$L_0(n)=L_A(4n)$ $L_1(n)=L_A(4n+1)$ $L_2(n)=L_A(4n+2)$ $L_3(n)=L_A(4n+3)$.

The above relationships imply that, in the absence of any lane-to-lane skew, the four 10-bit code groups that originate from the same XGMII transfer n are received starting from lane 0 and ending from lane 3. Bit ordering within each 10-bit code group transfer is therefore maintained. Reference numeral 704 in FIG. 7 illustrates one example of the reception of encoded data from four lanes over one lane.

In this example, skew introduced by the proposed transmission lane reduction mechanism itself may be the only skew component since there is no lane-to-lane skew when only one lane is used to transmit the encoded data. In particular embodiments, the demultiplexer 550 shown in FIG. 5B is not aware of the origin (the specific lane in the transmitting device's physical coding sublayer 120) of a received 10-bit code group. This may, for example, allow data originally associated with lane 0 of a transmitter to be transferred by the demultiplexer 550 into lane 1, lane 2, or lane 3 of the receiver. Reference numeral 706 in FIG. 7 illustrates one example of the skewed reception of encoded data from four lanes over one lane, where lane 3 is skewed and the start of a code group is in the incorrect lane. Reference numerals 708 and 710 illustrate other possible skewed receptions that could occur.

In the example shown in FIG. 5B, no dedicated deskew modules 210 may be needed since classical lane-to-lane skew is not a problem. Instead, the multiplexers 552 and a swap finite state machine 554 are used to correct for lane swaps before transferring the code groups to the 8B/10B decoders 212. In this example, the swap finite state machine 554 is used to monitor the incoming 10-bit code groups, detect a lane swap scenario, establish the correct lane ordering, and compensate for the skew introduced by the swap effect. This is done in order to make the lane reduction and lane reconstruction processes transparent. Additional details regarding the finite state machine 554 are provided below.

Both approaches described above for overcoming false comma detection could also be used with the device 100 operating as shown in FIG. 5B. In the first approach, during the running disparity update process, the decoders 212 may effectively be working as a 32B/40B decoder. Each decoder 212 updates its own current running disparity value but does not use the updated value itself. Using the same notation as above, the current running disparity values are updated as follows:

LANE 0: $RD_0(n)=URD_3(n-1)$

LANE 1: $RD_1(n)=URD_0(n)$

LANE 2: $RD_2(n)=URD_1(n)$

LANE 3 $RD_3(n)=URD_2(n)$.

The initial running disparity of the receiver may assume either a positive or negative value, which implies:

$RD_0(0)$=negative or positive $RD_1(0)=URD_0(0)$ $RD_2(0)=URD_1(0)$ $RD_3(0)=URD_2(0)$.

Using the second approach, the synchronization module 206 attempts to locate four consecutive commas instead of only one. In particular embodiments, a ||K|| ordered set appears at the synchronization module 206 as a sequence of four consecutive /K/ code groups as shown at reference numeral 704 in FIG. 7. When the synchronization module 206 detects a first comma, it locks temporarily to the specific 10-bit code group delineation implied by the first comma detection. In the absence of bit errors, the synchronization module 206 may expect three commas in the next three 10-bit code groups. If four consecutive commas are present in the expected bit positions, the synchronization module 206 has detected a valid comma. This event may be used in place of the PUDI([/COMMA/]) message defined in Clause 48 FIG. 48-7 of the IEEE 802.3 standard.

In the absence of bit errors, the probability of having four false comma detections across four successive code group boundaries of interleaved code groups coming from four different lanes can become arbitrarily low by increasing the number of double comma checks performed by the synchronization module 206 before achieving synchronization. The synchronization finite state machine defined in Clause 48 FIG. 48-7 of the IEEE 802.3 standard performs four checks, which gives a probability of error that is less than $10^{-32}$.

Although FIGS. 5A and 5B illustrate additional details of one example device 100 for receiving multi-lane encoded data streams using a reduced number of lanes, various changes may be made to FIGS. 5A and 5B. For example, while shown as receiving encoded data from four lanes using one lane or two lanes, the mechanisms shown in FIGS. 5A and 5B could be modified to receive any multi-lane encoded data stream using any suitable reduced number of lanes.

Figure 8A:
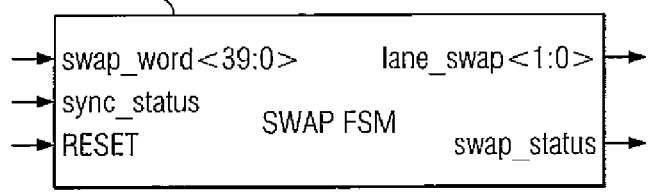
FIGS. 8A through 8C illustrate an example swap finite state machine according to one embodiment of this disclosure.
Figure 8B:
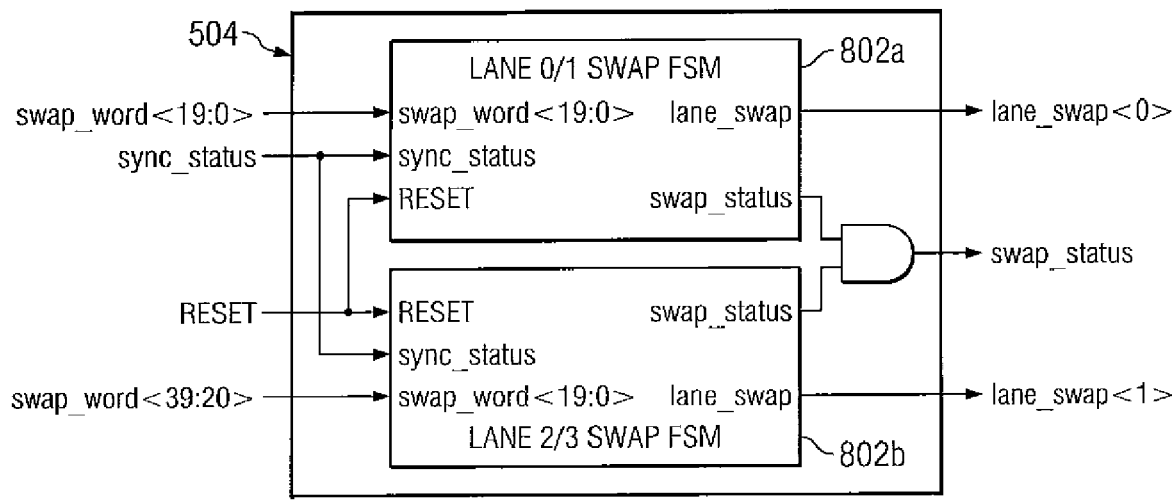
Figure 8C:
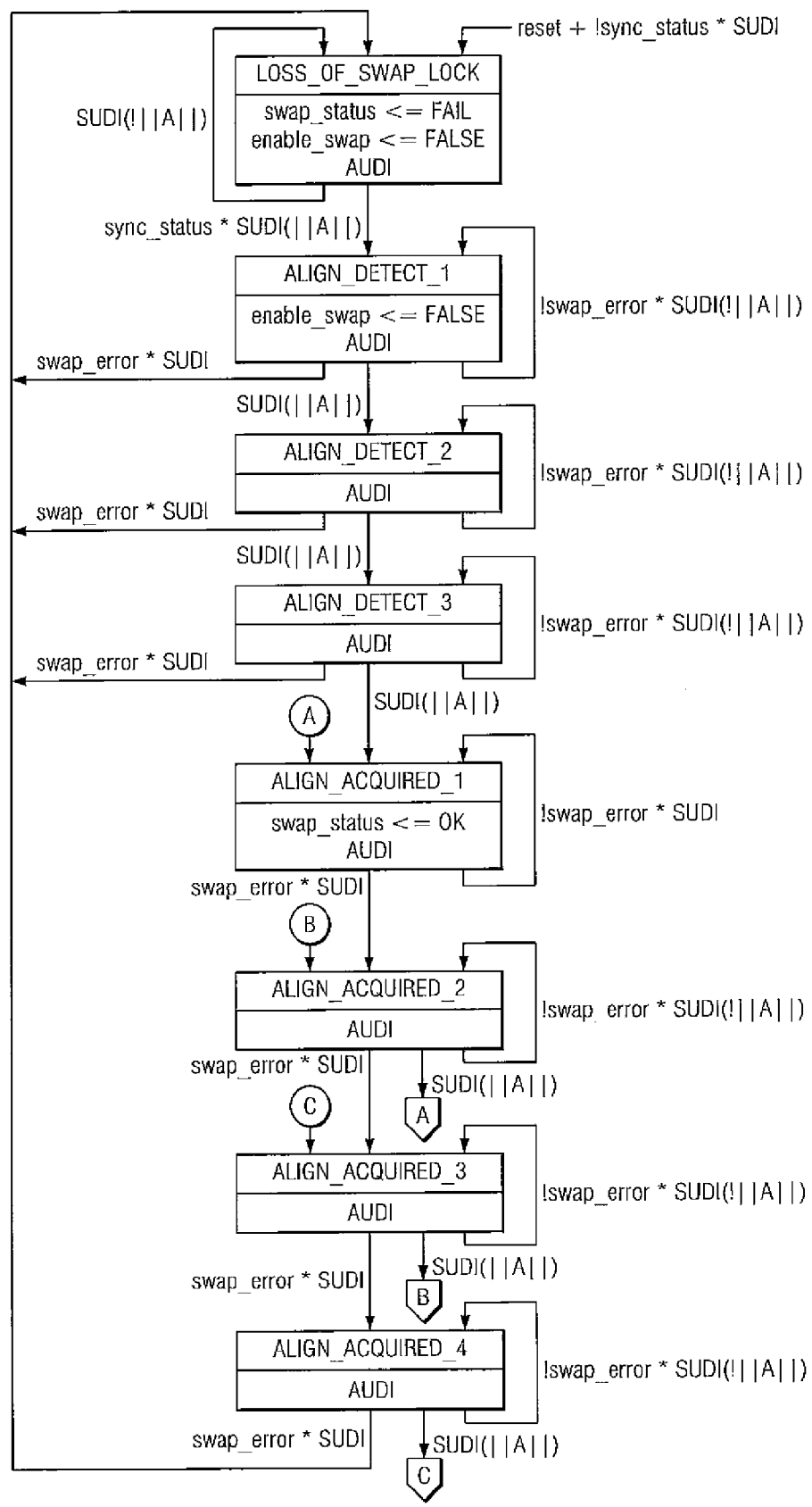

FIGS. 8A through 8C illustrate an example swap finite state machine according to one embodiment of this disclosure. In particular, FIG. 8A illustrates an example swap finite state machine 554, FIG. 8B illustrates an example swap finite state machine 504, and FIG. 8C illustrates the logic within the swap finite state machines 504, 554.

As noted above, the swap finite state machines 504, 554 may be used to correct lane swaps in which code groups from one lane are demultiplexed into incorrect lanes. In these embodiments, the swap finite state machines 504, 554 are capable of controlling the multiplexers 502, 552 to place the code groups into the correct lanes.

As shown in FIGS. 8A and 8B, the swap finite state machines 504, 554 have inputs and outputs as shown in Table 1 according to particular embodiments.

TABLE 1

| Signal | I/O | Size | Description |
| --- | --- | --- | --- |
| swap_word | In | 4 × 10 | Four 10-bit code groups representing the swapped code groups before they are sent to the deskew modules 210 (2:4 architecture) or to the decoders 212 (1:4 architecture). Constantly monitored by the finite state machine. |
| lane_swap | Out | 2 | Output vector controlling multiplexers 502, 552. The bit functionality changes depending on the implemented architecture (2:4 or 1:4) as described in Table 2. Also used to compensate for the skew introduced by the swap effect. Skew compensation is applied after lane swapping and is expressed in 1 10-bit code group period. |
| sync_status | In | 1 | Flag from synchronization module(s) 206. |
| swap_status | Out | 1 | Flag set when finite state machine has achieved lock. |
| reset | In | 1 | Finite state machine reset. |

TABLE 2

| lane_swap(1) | lane_swap(0) | Description, 2:4 architecture | Description, 1:4 architecture |
| --- | --- | --- | --- |
| 0 | 0 | Lane 0 Mux sel: 0; comp = 0 | Lane 0 Mux sel: 00; comp = 0 |
| | | Lane 1 Mux sel: 0; comp = 0 | Lane 1 Mux sel: 01; comp = 0 |
| | | Lane 2 Mux sel: 0; comp = 0 | Lane 2 Mux sel: 10; comp = 0 |
| | | Lane 3 Mux sel: 0; comp = 0 | Lane 3 Mux sel: 11; comp = 0 |
| 0 | 1 | Lane 0 Mux sel: 1; comp = 1 | Lane 0 Mux sel: 11; comp = 1 |
| | | Lane 1 Mux sel: 1; comp = 0 | Lane 1 Mux sel: 00; comp = 0 |
| | | Lane 2 Mux sel: 0; comp = 0 | Lane 2 Mux sel: 01; comp = 0 |
| | | Lane 3 Mux sel: 0; comp = 0 | Lane 3 Mux sel: 10; comp = 0 |
| 1 | 0 | Lane 0 Mux sel: 0; comp = 0 | Lane 0 Mux sel: 10; comp = 1 |
| | | Lane 1 Mux sel: 0; comp = 0 | Lane 1 Mux sel: 11; comp = 1 |
| | | Lane 2 Mux sel: 1; comp = 1 | Lane 2 Mux sel: 00; comp = 0 |
| | | Lane 3 Mux sel: 1; comp = 0 | Lane 3 Mux sel: 01; comp = 0 |
| 1 | 1 | Lane 0 Mux sel: 1; comp = 1 | Lane 0 Mux sel: 01; comp = 1 |
| | | Lane 1 Mux sel: 1; comp = 0 | Lane 1 Mux sel: 10; comp = 1 |
| | | Lane 2 Mux sel: 1; comp = 1 | Lane 2 Mux sel: 11; comp = 1 |
| | | Lane 3 Mux sel: 1; comp = 0 | Lane 3 Mux sel: 00; comp = 0 |

When the 2:4 architecture is used, the swap finite state machine 504 is modified as shown in FIG. 8B. Two finite state machines 802a-802b are used. Each independently tracks /A/ code groups, one operating on lanes 0 and 1 and the other operating on lanes 2 and 3. The finite state machines 802a-

802b are identical to the finite state machine 554, with some minor variations in variable definitions and input/output sizes. In particular, the swap_word input size is reduced from 40 to 20 and the lane_swap output size is reduced from two to one for each of the state machines 802a-802b. Taking into account the variable redefinitions, the state diagram shown in FIG. 8C is valid for both architectures.

The swap finite state machines 504, 554 can be derived from a variation of the deskew finite state machine defined in Clause 48 FIG. 48-8 of the IEEE 802.3 standard, with some variables redefined. The state diagram shown in FIG. 8C operates using the following variable and message definitions.

Variables sync_status: Boolean variable that is set to true when all synchronization modules 206 have achieved 10-bit code group delineation.

Reset: Boolean variable that controls the resetting of the PCS 120. It is true whenever the finite state machine reset input is set to 1, which occurs whenever a reset is necessary (including when a reset is initiated from a Management Data Input/Output or "MDIO," during power on, and when the MDIO has put the PCS 120 into low-power mode).

enable_swap: Boolean variable that is set to true to enable the lane swap process and to false when entering the ALIGN_DETECT_1 state. When enable_swap is true, the state machine 504, 554 tries different lane_swap combinations in case swap error is detected. The precise method for determining the next candidate lane_swap setting is implementation dependent. All possible lane_swap combinations may be evaluated.

swap_status: Boolean variable that is set to true when the state machine 504, 554 achieves a locked state, i.e. when the state machine has compensated for any swap or skew introduced by the lane reduction/expansion.

swap_error: Boolean variable that is set to true when, for the same n, $L_j(n)\text{!}=/A/$ and $L_k(n)\text{!}=/A/$, k !=j. k and j can range from 0 to 3 for the 1:4 architecture, 0 to 1 for the 2:4 architecture (lanes 0 and 1), and 2 to 3 for the 2:4 architecture (lanes 2 and 3).

$L_j$ is related to the top-level swap_word 40-bit input using the following correspondence:

$L_0$=swap_word<9:0>
$L_1$=swap_word<19:10>
$L_2$=swap_word<29:20>
$L_3$=swap_word<39:30>.

Messages

SW(swap_word): Alias for the swap_word signal sent by the deskew modules 210 to the PCS receive process and the state machine 504, 554 conveying code_groups over each lane. Swap_word is 40 bits wide for the 1:4 architecture or 20 bits wide for the 2:4 architecture. For the 1:4 architecture, SW(‖A‖) is true when all four code groups present in swap_word are /A/ code groups. For the 2:4 architecture, SW(‖A‖) is true when both code groups present in swap_word are /A/ code groups.

Using these variables and messages, the finite state machine 504, 554 may operate as shown in FIG. 8C.

In these embodiments, to achieve a lock state and determine the correct lane ordering, the swap finite state machines 504, 554 take advantage of the /A/ code group and the ‖A‖ ordered set that are transmitted as part of an idle stream code group sequence. An ‖A‖ ordered set may be received in only a finite number of possible ways by a receiver depending on the architecture. When no lane swap has occurred, the /A/ code groups of an ‖A‖ ordered set appear simultaneously on all four lanes in the 1:4 architecture or simultaneously on each lane of a two-lane pair in the 2:4 architecture. This can be formalized as follows, where m equals n for the 1:4 architecture:

$$L_0(n)=/A/$$

$$L_1(n)=/A/$$

$$L_2(m)=/A/$$

$$L_3(m)=/A/.$$

Any other occurrence of an /A/ code group different than the one specified above may be the result of a lane swap, and the swap finite state machines 504, 554 set the swap_error flag. This also carries an implicit lane-to-lane skew of one 10-bit code group period, as shown by reference numeral 606 in FIG. 6 and reference numerals 706-710 in FIG. 7. The swap finite state machines 504, 554 correct the lane swap and compensate for the skew by adding a delay associated with one 10-bit code group on the necessary lane(s).

The swap finite state machines 504, 554 may start by assuming that no lane swap is needed and by setting the lane_swap output to a binary "00." When lane synchronization has been achieved (the sync_status flag is set), the swap finite state machines 504, 554 monitor the swap_word bus looking for /A/ code groups. When an /A/ code group is found, if the swap_error flag is set, a new lane_swap combination is tested. Otherwise, after four consecutive ‖A‖ ordered sets are received with no swap_error, the swap finite state machines 504, 554 set the swap_status variable to OK and continue to monitor for valid /A/ code group sequences. Lock could be lost when four consecutive swap errors are detected.

Although FIGS. 8A through 8C illustrate one example of a swap finite state machine 504, 554, various changes may be made to FIGS. 8A through 8C. For example, any other suitable state machine or other mechanism could be used to control the correction of lane swaps in the device 100.

Figure 9:
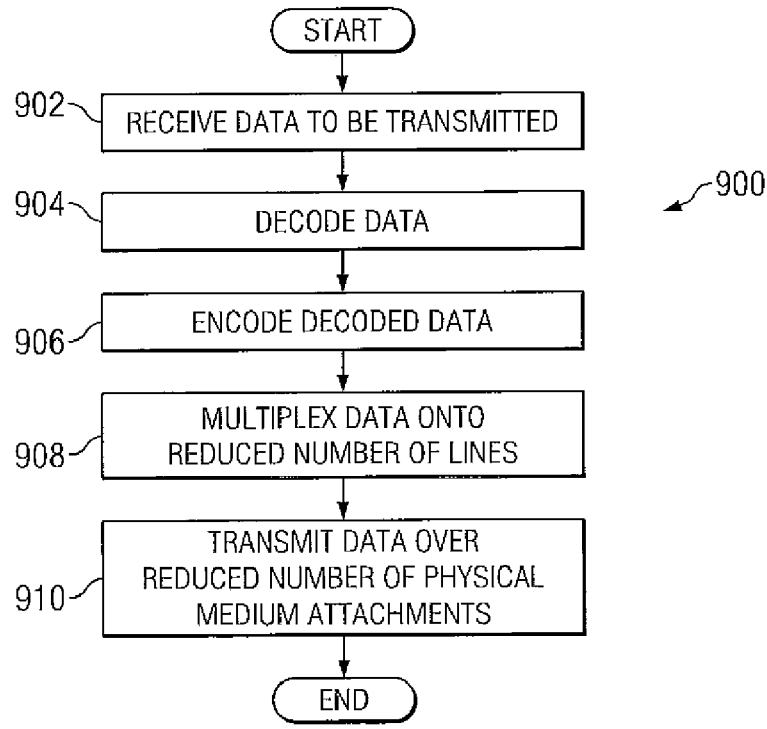
FIG. 9 illustrates an example method for transmitting a multi-lane encoded data stream using a reduced number of lanes according to one embodiment of this disclosure.

FIG. 9 illustrates an example method 900 for transmitting a multi-lane encoded data stream using a reduced number of lanes according to one embodiment of this disclosure. For ease of explanation, the method 900 of FIG. 9 is described with respect to the device 100 of FIG. 1. The method 900 could be used with any other suitable device or system.

The device 100 receives data to be transmitted at step 902. This may include, for example, receiving 8B/10B encoded data at the serializers/deserializers 102a and deserializing that encoded data. This may also include storing the deserialized data in the FIFO queues 106.

The device 100 decodes the received data at step 904. This may include, for example, a 10GBase-X decoder 108 retrieving the deserialized data from the FIFO queues 106. This may also include the synchronization modules 110, deskew modules 112, and 8B/10B decoders 114 operating on the deserialized data to decode the deserialized data.

The device 100 then encodes the decoded data at step 906. This may include, for example, the 10GBase-X decoder 108 storing the decoded data in the FIFO block 116. This may also include an 8B/10B aggregate transmitter 122 retrieving the data from the FIFO block 116 and the 8B/10B encoders 124 encoding the data.

The device 100 multiplexes the encoded data onto a reduced number of lanes at step 908. This may include, for example, the multiplexers 126 multiplexing the encoded data onto two lanes or the multiplexer 302 multiplexing the encoded data onto one lane.

The device 100 transmits the multiplexed data over a reduced number of physical medium attachments at step 910.

This may include, for example, one or two serializers/deserializers 102b deserializing the multiplexed encoded data for transmission over one or two transmission lines.

Although FIG. 9 illustrates one example of a method 900 for transmitting a multi-lane encoded data stream using a reduced number of lanes, various changes may be made to FIG. 9. For example, any suitable reduced number of transmission lanes may be used, and the method 900 is not limited to use with only one or two transmission lanes.

Figure 10:
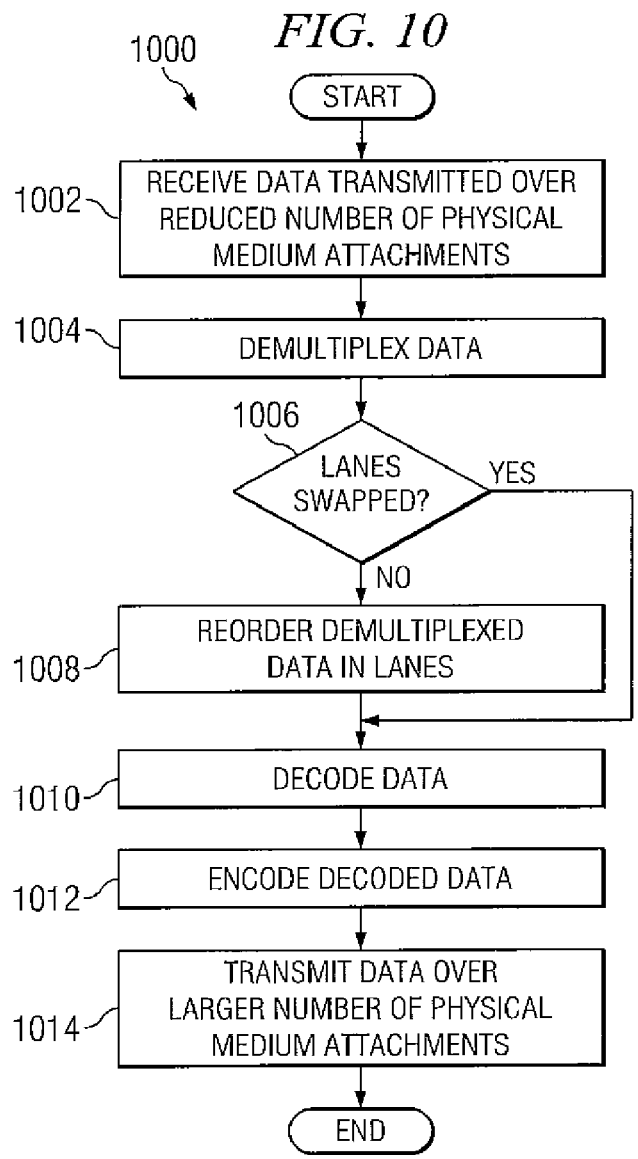
FIG. 10 illustrates an example method for receiving a multi-lane encoded data stream using a reduced number of lanes according to one embodiment of this disclosure.

FIG. 10 illustrates an example method 1000 for receiving a multi-lane encoded data stream using a reduced number of lanes according to one embodiment of this disclosure. For ease of explanation, the method 1000 of FIG. 10 is described with respect to the device 100 of FIG. 2. The method 1000 could be used with any other suitable device or system.

The device 100 receives encoded data transmitted over a reduced number of physical medium attachments at step 1002. This may include, for example, one or two serializers/deserializers 102b receiving encoded data over one or two transmission lines. This may also include the one or two serializers/deserializers 102b deserializing the received data.

The device 100 demultiplexes the encoded data at step 1004. This may include, for example, the demultiplexers 208 demultiplexing the encoded data from two lanes into four lanes or the demultiplexer 550 demultiplexing the encoded data from one lane into four lanes.

The device 100 determines if any lanes in the demultiplexed data are swapped at step 1006. This may include, for example, the finite state machine 504 or 554 tracking /A/ code groups in the demultiplexed data to determine if a lane swap has occurred. If so, the device 100 reorders the demultiplexed data into the appropriate lanes at step 1008. This may include, for example, using the multiplexers 502 or 552 to reorder the decoded data into the appropriate lanes so that the start of a code group appears in lane 0. This may also include compensating for the delay associated with the lane swap.

The device 100 decodes the encoded data at step 1010. This may include, for example, the 8B/10B decoders 212 decoding the encoded data. The device 100 then encodes the decoded data at step 1012. This may include, for example, the 10GBase-X encoder 216 retrieving the decoded data from the FIFO block 116. This may also include the 8B/10B encoders 218 encoding the data using 8B/10B coding.

The device 100 transmits the encoded data to an appropriate destination using a larger number of physical medium attachments at step 1014. This may include, for example, the 10GBase-X encoder 216 providing the encoded data to four serializers/deserializers 102a. This may also include the serializers/deserializers 102a deserializing the encoded data and transmitting the data over four transmission lines.

Although FIG. 10 illustrates one example of a method 1000 for receiving a multi-lane encoded data stream using a reduced number of lanes, various changes may be made to FIG. 10. For example, any suitable reduced number or larger number of transmission lanes may be used, and the method 1000 is not limited to use with only one, two, or four transmission lanes.

Figure 11:
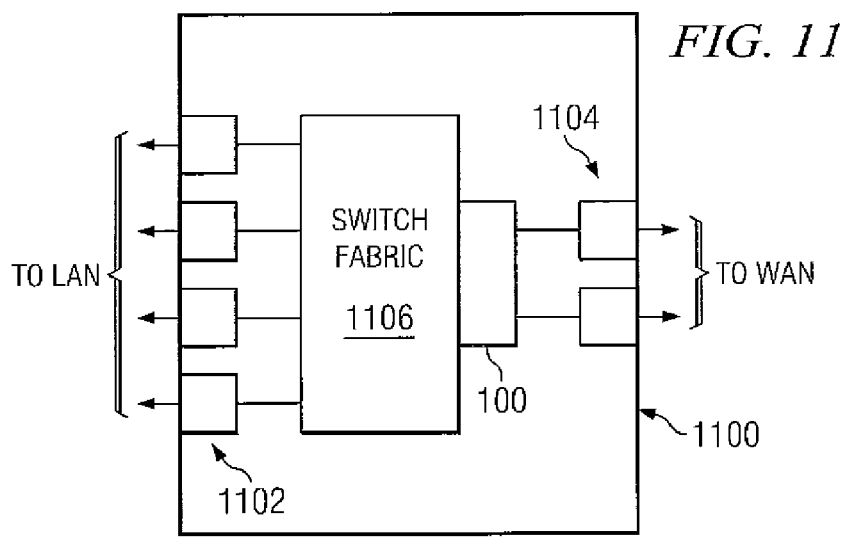
FIG. 11 illustrates an example apparatus implementing the device of FIGS. 1 and 2 according to one embodiment of this disclosure.

FIG. 11 illustrates an example apparatus 1100 implementing the device of FIGS. 1 and 2 according to one embodiment of this disclosure. In this example, the apparatus 1100 represents a switch or router (referred to collectively as a "switching/routing apparatus") capable of facilitating the transfer of data between a local area network (LAN) and a wide area network (WAN).

In this example, the apparatus 1100 includes LAN ports 1102 coupling the apparatus 1100 to the local area network and WAN ports 1104 coupling the apparatus 1100 to the wide area network. Each of the ports 1102-1104 represents a structure capable of being coupled to a transmission medium, such as a connector capable of receiving an Ethernet cable.

The apparatus 1100 also includes a switch fabric 1106. The switch fabric 1106 is capable of routing information between various ones of the ports 1102 and/or 1104. For example, the switch fabric 1106 could receive data from a LAN port 1102 and route the data to another LAN port 1102 or to a WAN port 1104. The switch fabric 1106 could also receive data from a WAN port 1104 and route the data to a LAN port 1102 or to another WAN port 1104. The switch fabric 1106 includes any suitable structure for switching data.

As shown in FIG. 11, the device 100 of FIGS. 1 and 2 is used to transform data flowing between the local area network and the wide area network. In some embodiments, the device 100 enables data to be transmitted to the local area network using a larger number of physical medium attachments (such as four) and to the wide area network using a reduced number of physical medium attachments (such as one or two). Although not shown, a bypass mechanism could be provided that bypasses this conversion when the apparatus 1100 needs to route data from one WAN port 1104 to another WAN port 1104.

Although FIG. 11 illustrates one example of an apparatus 1100 implementing the device of FIGS. 1 and 2, various changes may be made to FIG. 11. For example, FIG. 11 has been simplified for ease of illustration and explanation. The apparatus 1100 could include any additional components (such as components normally used in a switch or router) according to particular needs. Also, the device 100 could be used in any other router, switch, or other device or system.

In some embodiments, various coding or other functions described above may be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. However, the various coding functions described above could be implemented using any other suitable logic (hardware, software, firmware, or a combination thereof).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving first encoded data, the first encoded data associated with one or more first lanes;
decoding the first encoded data to produce decoded data, wherein decoding further comprises deskewing the first encoded data;
encoding the decoded data to produce second encoded data, the second encoded data associated with one or more second lanes;
multiplexing the second encoded data or demultiplexing the first encoded data;
transmitting the second encoded data;
when the second encoded data is multiplexed, serializing or deserializing the second encoded data after the multiplexing and prior to the transmitting; and
when the first encoded data is demultiplexed, deserializing or serializing the first encoded data prior to the decoding and prior to the demultiplexing,
wherein a number of first lanes is different than a number of second lanes, multiplexing the second encoded data comprises placing the second encoded data into the one or more second lanes, and demultiplexing the first encoded data comprises receiving the first encoded data from the one or more first lanes.

2. The method of claim 1, wherein encoding the decoded data to produce the second encoded data comprises generating a plurality of code group sequences using the decoded data, and wherein multiplexing the second encoded data comprises multiplexing the plurality of code group sequences into the one or more second lanes.

3. The method of claim 2, wherein the first encoded data is associated with four first lanes and the second encoded data is associated with one second lane or two second lanes.

4. The method of claim 2, wherein encoding the decoded data to produce the second encoded data comprises using a plurality of encoders, the method further comprising:
jointly calculating running disparity values using pairs of encoders to avoid generating comma strings across code group boundaries.

5. The method of claim 1, wherein demultiplexing the first encoded data comprises demultiplexing a plurality of code group sequences from the one or more first lanes into a plurality of the second lanes, and decoding the first encoded data comprises decoding each of the code group sequences to produce the decoded data.

6. The method of claim 5, wherein the first encoded data is associated with one first lane or two first lanes and the second encoded data is associated with four second lanes.

7. The method of claim 5, wherein decoding the first encoded data comprises using a plurality of decoders, the method further comprising:
jointly calculating running disparity values using pairs of decoders to avoid detecting comma strings across code group boundaries.

8. The method of claim 5, wherein decoding the first encoded data comprises using one or more synchronization modules, the method further comprising:
identifying a plurality of consecutive comma strings using the one or more synchronization modules to avoid detecting comma strings across code group boundaries.

9. The method of claim 5, further comprising:
determining if at least some of the code group sequences are demultiplexed into inappropriate ones of the second lanes; and
swapping at least some of the code group sequences between at least some of the second lanes if at least some of the code group sequences are demultiplexed into inappropriate ones of the second lanes.

10. The method of claim 9, further comprising:
delaying one or more of the code group sequences to compensate for a delay associated with the code group sequences being demultiplexed into inappropriate ones of the second lanes.

11. The method of claim 1, further comprising:
storing the decoded data in a first input first output (FIFO) block prior to encoding.

12. The method of claim 1, wherein each first lane and each second lane is associated with a different physical medium attachment.

13. The method of claim 1, further comprising:
passing the first encoded data through a first input first output (FIFO) queue before decoding the first encoded data.

14. The method of claim 1, wherein prior to encoding, the decoded data is passed as a single output of a physical coding sublayer (PCS) module.

15. An apparatus, comprising:
one or more first physical medium attachments configured to receive first encoded data;
a plurality of decoders configured to decode the first encoded data to produce decoded data, each of the plurality of decoders comprising a deskew module configured to deskew the first encoded data;
a plurality of encoders configured to encode the decoded data to produce second encoded data;
one or more second physical medium attachments configured to transmit the second encoded data;
one or more multiplexers configured to multiplex the second encoded data by placing the second encoded data into the one or more second physical medium attachments or one or more demultiplexers configured to receive the first encoded data from the one or more first physical medium attachments and demultiplex the first encoded data;
when the second encoded data is multiplexed, a serializer or deserializer that serializes or deserializes the second encoded data after the multiplexing and prior to the transmitting; and
when the first encoded data is demultiplexed, a deserializer or serializer that deserializes or serializes the first encoded data prior to passing to at least one of the plurality of decoders and prior to the demultiplexing,
wherein a number of the first physical medium attachments is different than a number of the second physical medium attachments.

16. The apparatus of claim 15, wherein the plurality of encoders are configured to generate a plurality of code group sequences using the decoded data, and the multiplexers are configured to multiplex the plurality of code group sequences for transmission using the one or more second physical medium attachments.

17. The apparatus of claim 16, wherein pairs of encoders are configured to jointly calculate running disparity values to avoid generating comma strings across code group boundaries.

18. The apparatus of claim 16, wherein the first encoded data is received using four first physical medium attachments and the second encoded data is transmitted using one second physical medium attachment or two second physical medium attachments.

19. The apparatus of claim 15, wherein the demultiplexers are configured to demultiplex a plurality of code group sequences received using the one or more first physical medium attachments and the plurality of decoders are configured to decode each of the code group sequences to produce the decoded data.

20. The apparatus of claim 19, wherein pairs of decoders are configured to jointly calculate running disparity values to avoid detecting comma strings across code group boundaries.

21. The apparatus of claim 19, further comprising one or more synchronization modules configured to identify a plurality of consecutive comma strings in the code group sequences to avoid detecting comma strings across code group boundaries.

22. The apparatus of claim 19, wherein the first encoded data is received using one first physical medium attachment or two first physical medium attachments and the second encoded data is transmitted using four second physical medium attachments.

23. The apparatus of claim 19, wherein the demultiplexers are configured to demultiplex the plurality of code group sequences into a plurality of lanes, the apparatus further comprising:
a state machine configured to determine if at least some of the code group sequences are demultiplexed into inappropriate ones of the lanes; and
a plurality of multiplexers configured to swap at least some of the code group sequences between at least some of the lanes if at least some of the code group sequences are demultiplexed into inappropriate ones of the lanes.

24. The apparatus of claim 23, wherein the state machine is further configured to delay one or more of the code group sequences to compensate for a delay associated with the code group sequences being demultiplexed into inappropriate ones of the lanes.

25. The apparatus of claim 15, wherein the first encoded data comprises data encoded using 8B/10B encoding and the second encoded data comprises data encoded using 8B/10B encoding.

26. A non-transitory computer readable media storing logic, the logic configured to:
receive first encoded data, the first encoded data associated with one or more first lanes;
deskew the first encoded data;
decode the first encoded data to produce decoded data;
encode the decoded data to produce second encoded data, the second encoded data associated with one or more second lanes;
multiplex the second encoded data or demultiplex the first encoded data;
transmit the second encoded data;
if the second encoded data is multiplexed, serialize or deserialize the second encoded data after the multiplexing and prior to the transmitting; and
if the first encoded data is demultiplexed, deserialize or serialize the first encoded data prior to the decoding and prior to the demultiplexing,
wherein a number of the first lanes is different than a number of the second lanes, multiplexing the second encoded data places the second encoded data into the one or more second lanes, and demultiplexing the first encoded data receives the first encoded data from the one or more first lanes.

27. The non-transitory computer readable media of claim 26, wherein the logic configured to encode the decoded data to produce the second encoded data generates a plurality of code group sequences using the decoded data, and
the logic configured to multiplex the second encoded data multiplexes the plurality of code group sequences into the one or more second lanes.

28. The non-transitory computer readable media of claim 26, wherein the logic configured to demultiplex the first encoded data demultiplexes a plurality of code group sequences from the one or more first lanes into a plurality of the second lanes, and
the logic configured to decode the first encoded data decodes each of the code group sequences to produce the decoded data.

29. The non-transitory computer readable media of claim 28, wherein the logic is further configured to:
determine if at least some of the code group sequences are demultiplexed into inappropriate ones of the second lanes; and
if at least some of the code group sequences are demultiplexed into inappropriate ones of the second lanes,
swap at least some of the code group sequences between at least some of the second lanes, and
delay one or more of the code group sequences to compensate for a delay associated with the code group sequences being demultiplexed into inappropriate ones of the second lanes.

* * * * *